United States Patent
Chang et al.

(10) Patent No.: US 7,152,013 B2
(45) Date of Patent: Dec. 19, 2006

(54) HEAT DISSIPATING METHOD

(75) Inventors: Chi-Tsung Chang, Taipei (TW);
Ying-Chih Lu, Taipei (TW);
Meng-Hua Cheng, Taipei (TW);
Chun-Yi Lee, Taipei (TW); Ling-Hung Yu, Taipei (TW); Chia-Hsing Lee, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/053,571

(22) Filed: Feb. 7, 2005

(65) Prior Publication Data
US 2006/0178785 A1    Aug. 10, 2006

(51) Int. Cl.
*G01K 1/08* (2006.01)
*G01K 13/00* (2006.01)
*G06F 15/00* (2006.01)
*G06F 1/20* (2006.01)
*G05D 23/00* (2006.01)

(52) U.S. Cl. ............ 702/132; 700/299; 361/687; 361/688; 374/141

(58) Field of Classification Search .......... 700/299, 700/300; 702/130, 132, 133, 136, 99; 710/48, 710/72; 713/300, 320, 322, 324, 330, 340; 361/683, 687, 688; 374/141
See application file for complete search history.

(56) References Cited
U.S. PATENT DOCUMENTS 5,835,885 A * 11/1998 Lin ........................... 702/99
6,286,109 B1 * 9/2001 Pirdy ......................... 713/340
6,309,099 B1 * 10/2001 Chang ........................ 374/183
6,573,671 B1 * 6/2003 Montero et al. ............. 318/53
6,643,126 B1 * 11/2003 Su ............................. 361/685
6,735,499 B1 * 5/2004 Ohki et al. .................. 700/299
6,760,649 B1 * 7/2004 Cohen ........................ 700/299
6,873,883 B1 * 3/2005 Ziarnik ....................... 700/300
6,922,787 B1 * 7/2005 Karpel et al. ............... 713/320
2003/0176985 A1 * 9/2003 Chen ......................... 702/132
2004/0098521 A1 * 5/2004 Lin ............................ 710/72
2004/0190242 A1 * 9/2004 Lee ............................ 361/687
2005/0216221 A1 * 9/2005 Broyles et al. ............. 702/132

* cited by examiner

*Primary Examiner*—Crystal J. Barnes
(74) *Attorney, Agent, or Firm*—Peter F. Corless; Steven M. Jensen; Edwards Angell Palmer & Dodge LLP

(57) ABSTRACT

A heat dissipating method is applied to a computer system having a timing signaling mechanism and a temperature sensing unit. Firstly, a process of setting a dissipating temperature operating mode is performed. Then, a periodic signal is regularly transmitted to a basic input output system by the timing signaling mechanism of the computer system, and a temperature of each of hardware devices is regularly sensed by the temperature sensing unit. Subsequently, a heat dissipating unit of each of the hardware devices is actuated to perform a heat dissipation process according to the temperature sensed by the temperature sensing unit and the dissipating temperature operating mode. Therefore, the present invention can control operating intensity of the heat dissipating units and achieve hardware monitoring without requiring additional software or hardware, such that heat dissipating and operation efficiencies of the hardware devices of the computer system can be improved.

19 Claims, 4 Drawing Sheets

| Rotation speed (S=full speed) | Temperature range (T: sensed temperature) |
|---|---|
| S × 100% | T ≧ 35°C |
| S × 90% | 35°C > T ≧ 31°C |
| S × 70% | 31°C > T ≧ 27°C |
| S × 60% | 27°C > T |

FIG. 3

HEAT DISSIPATING METHOD

FIELD OF THE INVENTION

The present invention relates to heat dissipating methods, and more particularly, to a heat dissipating method applicable to a computer system having a timing signaling mechanism.

BACKGROUND OF THE INVENTION

Along with the blooming development of electronic information technology, many products with multiple functions and reasonable prices have been proposed. For example, computer devices, such as large scale supercomputers, server hosts, personal computers, notebook computers and so on, all have become essential tools in the human daily life. Due to advancement of semiconductor fabrication technology that more and more circuits can be incorporated within a single integrated circuit (IC), computer products are gradually reduced in size and improved in operation speed. For example, a central processing unit (CPU) of a computer hardware device has been continuously updated and its operation speed has been increased exponentially.

However, the size reduction and improved operation speed of the computer hardware device would increase power consumption and result in a heat dissipation problem. The stability of operation of a computer system is affected by temperature. Generally, a heat dissipating unit (such as a fan) is mounted in a hardware portion of the computer device where temperature is increased during operation of electronic elements, such as a central processing unit, a computer casing containing various electronic elements therein, etc., so as to prevent system crash or damage to internal electronic elements due to an excessively high temperature. Furthermore, an amount of power consumption may directly influence lifetime of a portable computer device (such as a notebook computer). In general, a user usually selects a battery with relatively higher capacity to increases the lifetime of the device. However, the temperature of the computer casing would be more easily increased due to such high power consumption.

For current design of the computer system, such as construction of a server or a workstation, hardware monitoring has become one of important considerations. This allows the user to monitor a status of computer hardware in a real-time manner and flexibly dynamically adjust configuration of the computer hardware such as various monitoring items including voltage monitoring, temperature monitoring and fan control depending on personal requirements. Temperature monitoring of the central processing unit of the computer hardware device is the most important monitoring item. A corresponding function of controlling a rotation speed of the heat dissipating fan is implemented by obtaining a temperature of the computer hardware device in a hardware monitoring manner along with temperature changes caused during operation of the computer system to adjust operating intensity of the fan. In other words, the rotation speed of the fan can be controlled according to different temperatures of the computer hardware device, such that the computer system can operate in a stable environmental temperature, and operation efficiency of the computer system can be improved. Practically, a solution to the foregoing heat dissipation problem is to mount a baseboard management controller (BMC) in the computer system to perform hardware monitoring and achieve relative hardware control functions. This however increases costs of the computer system and complicates the system design. As a result, such hardware monitoring method to adjust the operating intensity of the fan according to the temperature of the computer hardware device is usually applied to an advanced computer system rather than a low level computer system in consideration of high costs and system complexity. Moreover, the rotation speed of the fan may also be controlled using software in some cases. However, this requires additional designs and programs, and different software designs must be used for different computer operating systems, thereby not providing convenience.

Therefore, in light of the drawbacks caused by the conventional heat dissipation management technology for the computer system, the problem to be solved here is to provide a heat dissipating method, which can alter operating intensity of a heat dissipating fan according to a temperature of a computer hardware device without requiring an additional baseboard management controller or software, and can also be applied to a low level computer system.

SUMMARY OF THE INVENTION

In light of the above prior-art drawbacks, a primary objective of the present invention is to provide a heat dissipating method, which can achieve hardware monitoring to control operating intensity of a heat dissipating unit without requiring additional software or hardware.

Anther objective of the present invention is to provide a heat dissipating method applicable to a low level computer system.

In accordance with the above and other objectives, the present invention proposes a heat dissipating method applicable to a computer system having a timing signaling mechanism and a temperature sensing unit. The heat dissipating method comprises the steps of: performing a process of setting a dissipating temperature operating mode; and outputting a periodic signal regularly to a basic input output system via the timing signaling mechanism of the computer system, and sensing a temperature of each of hardware devices regularly via the temperature sensing unit, so as to allow a heat dissipating unit of each of the hardware devices to perform a heat dissipation process according to the temperature sensed by the temperature sensing unit and the dissipating temperature operating mode.

Unlike the conventional heat dissipating method, the present invention uses the timing signaling mechanism to regularly output a signal to the basic input output system so as to control operating intensity of the heat dissipating units. Therefore, hardware monitoring can be achieved without requiring additional software or hardware, such that heat dissipating and operation efficiencies of the hardware devices of the computer system can be improved.

BRIEF DESCRIPTION OF THE DRAWINGS

The present invention can be more fully understood by reading the following detailed description of the preferred embodiments, with reference made to the accompanying drawings, wherein:

FIG. 3 is a table of temperature ranges and corresponding fan rotation speeds, showing that a rotation speed of a fan is controlled by a heat dissipating method according to the present invention within a specific temperature range.

DETAILED DESCRIPTION OF THE PREFERRED EMBODIMENTS

Figure 1:
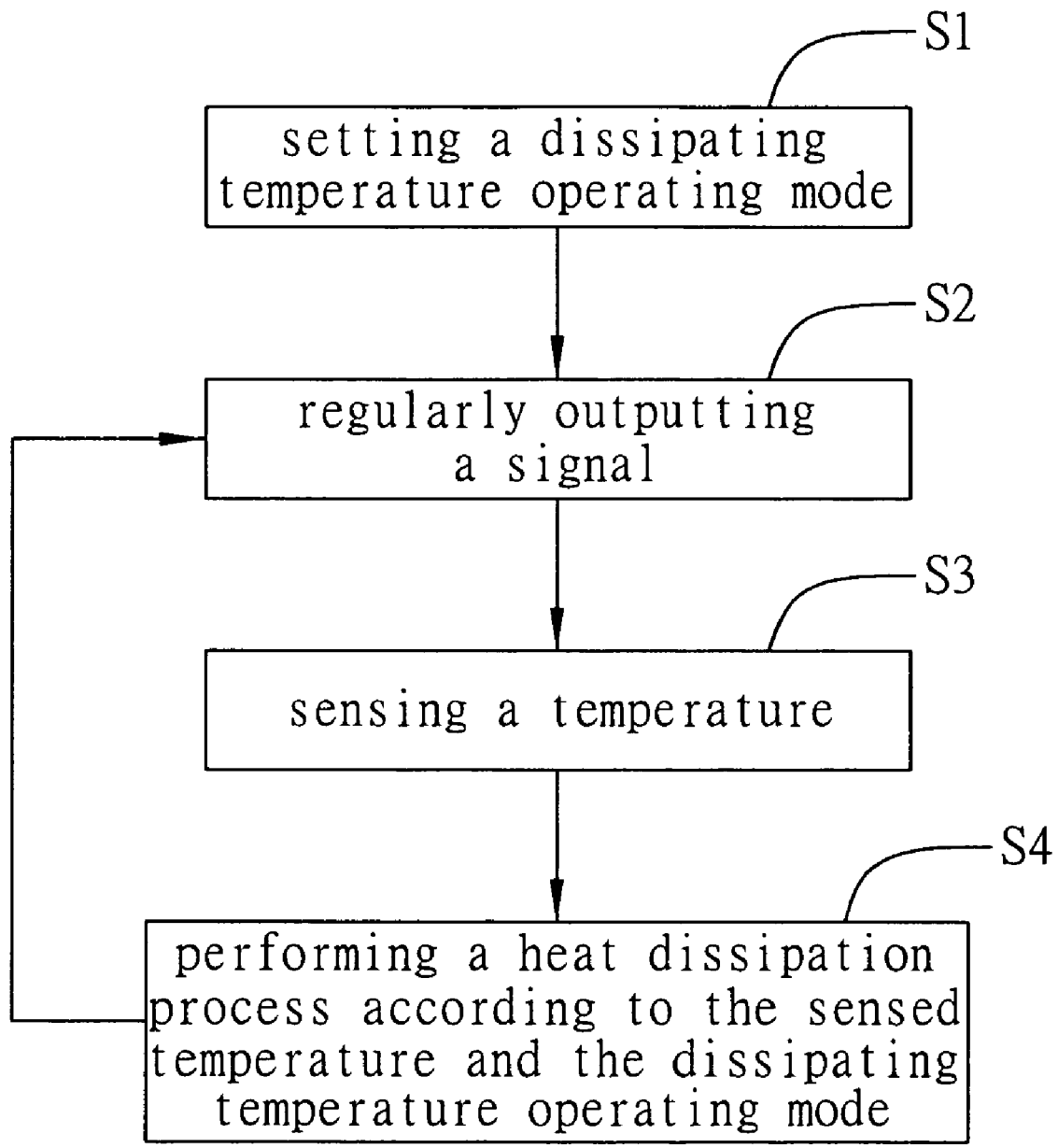
FIG. 1 is a flowchart showing basic steps of a heat dissipating method according to the present invention.

FIG. 1 is a flowchart showing basic steps of a heat dissipating method proposed in the present invention, which is used to describe the heat dissipating method in detail according to a basic preferred embodiment of the present invention. It should be noted that the drawings described below are simplified schematic diagrams and only show components related to the present invention.

Referring to FIG. 1, the heat dissipating method proposed in the present invention is applied to a computer system having a timing signaling mechanism, such as a notebook computer or a desktop computer. The heat dissipating method cooperates the timing signaling mechanism with a basic input output system (BIOS) of the computer system, and actuates a heat dissipating unit (such as a heat dissipating fan) for reducing a temperature of each of hardware devices of the computer system according to the temperature of each of the hardware devices, so as to improve heat dissipating and operation efficiencies of the computer system. The hardware device can be selected from the group consisting of a central processing unit (CPU), hard disk (HD), memory, CD/DVD-ROM (read-only memory) drive, floppy disk drive, power supplier and casing etc.

The heat dissipating method is implemented by the following steps. Firstly, in Step S1, a dissipating temperature operating mode is set up. Particularly, a dissipating temperature operating mode that has been established in a storage unit of the computer system is selected, wherein this dissipating temperature operating mode represents different heat dissipating efficiencies generated by the heat dissipating units of the hardware devices of the computer system within different temperature ranges. Content of the dissipating temperature operating mode is pre-established by a user and is stored in the storage unit of the computer system in a burning manner. The storage unit can be preferably a flash ROM, or alternatively can be selected from the group consisting of a programmable ROM (PROM), erasable programmable ROM (EPROM) and electrically erasable programmable ROM (EEPROM). Further, Step S1 is performed by the basic input output system during a power-on self test (POST) phase of the computer system. After the setting process in Step S1 has been completed, the heat dissipating method proceeds to Step S2.

In Step S2, a signal is regularly outputted. Step S2 is carried out after Step S1 and entering an operating system phase of the computer system. The timing signaling mechanism regularly outputs a periodic signal respectively to the basic input output system and the temperature sensing unit of the computer system. The timing signaling mechanism is provided in a chipset, preferably in a south bridge chipset. The periodic signal is a system management interrupt (SMI) signal. Subsequently, the heat dissipating method proceeds to Step S3.

In Step S3, a temperature is sensed. The periodic signal regularly outputted from the timing signaling mechanism of the computer system actuates the temperature sensing unit to regularly sense a temperature of each of the hardware devices. Subsequently, the heat dissipating method proceeds to Step S4.

In Step S4, a heat dissipation process is performed according to the sensed temperature and the dissipating temperature operating mode. Particularly, the heat dissipating unit of each of the hardware devices is actuated to perform the heat dissipation process by a control signal according to the temperature sensed by the temperature sensing unit and the dissipating temperature operating mode set in the basic input output system. The control signal is a pulse width modulation (PWM) signal outputted by a PWM controller. The PWM controller is provided in a chipset, preferably in a super input/output (SIO) chipset. Further, the heat dissipation process allows the heat dissipating unit of each of the hardware devices of the computer system to achieve specific operating intensity within a specific temperature range. After Step S4 has been completed, Step S2 is repeated, such that the operating intensity of the heat dissipating units of the hardware devices can be controlled in cycles.

Figure 2:
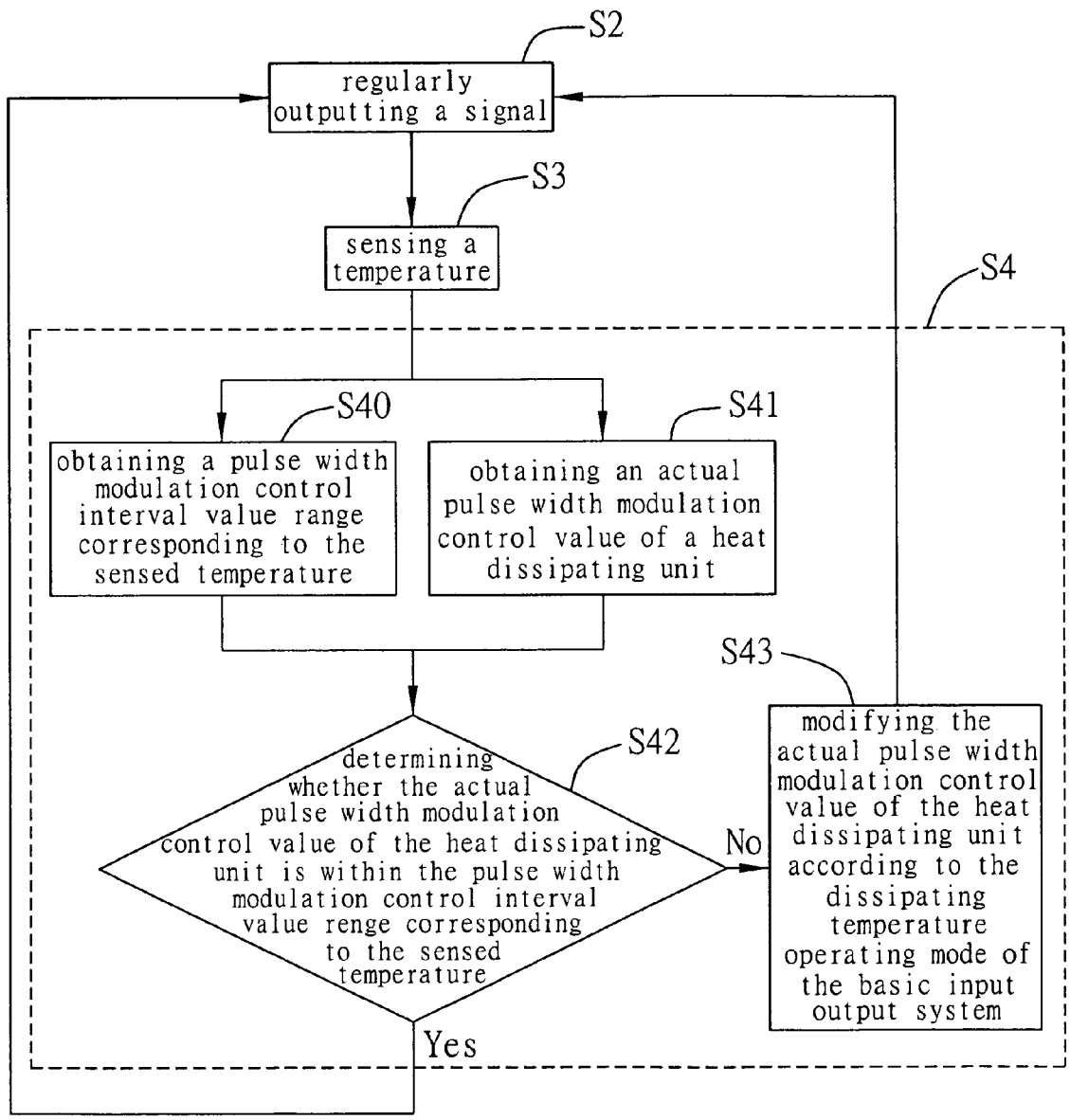
FIG. 2 is a flowchart showing detailed procedures of Step S4 in FIG. 1.

FIG. 2 is a flowchart showing detail procedures of Step S4 in FIG. 1. After the power-on self test (POST) phase of the computer system has been completed (as shown in Step S1 of FIG. 1), the operating system phase of the computer system is entered and Step S2 and Step S3 are performed. Subsequently, steps encompassed by dotted lines in FIG. 2 are carried out. Firstly, Step S40 and Step S41 are implemented respectively. In Step S40, a PWM control interval value range corresponding to the sensed temperature is obtained by the computer system. In Step S41, an actual PWM control value of the heat dissipating unit is obtained. Then, Step S42 is performed to determine whether the actual PWM control value of the heat dissipating unit is within the PWM control interval value range corresponding to the sensed temperature; if yes, Step S2 is repeated and a signal is regularly outputted by the timing signaling mechanism; if no, Step S43 is performed to modify the actual PWM control value of the heat dissipating unit according to the dissipating temperature operating mode of the basic input output system, and then Step S2 is repeated.

Accordingly, the heat dissipating method proposed in the present invention utilizes a hardware monitoring function of the SIO chipset to compare the actual PWM control value of the heat dissipating unit with the PWM control interval value range corresponding to the sensed temperature, so as to modify the actual PWM control value of the heat dissipating unit by the PWM controller and allow the heat dissipating unit to achieve specific operating intensity.

In order to clearly describe the foregoing dissipating temperature operating mode and heat dissipation process, FIG. 3 shows a table of specific operating intensity achieved within a specific temperature range by the heat dissipating unit that is controlled by the heat dissipating method in the present invention. Content of the table refers to the foregoing dissipating temperature operating mode established by the user in Step S1 and the foregoing heat dissipation process performed in Step S4 according to the dissipating temperature operating mode. The heat dissipating unit can be a heat dissipating fan. As shown in FIG. 3, the table comprises different temperature ranges, such as a highest temperature range (T≧35° C.), a moderate temperature range (35° C.>T≧31° C.), a low temperature range (31° C.≧T≧27° C.) and a lowest temperature range (27° C.>T).

During the heat dissipation process, the heat dissipating unit achieves the highest operating intensity (S×100%) within the highest temperature range (T≧35° C.), wherein the symbol S represents that the fan is rotated at a full speed. In other words, if an actual sensed temperature (T) is higher than or equal to 35° C., the fan operates at the full speed. Further, the heat dissipating unit achieves moderate operating intensity (S×90%) within the moderate temperature range (35° C.>T31° C.). In other words, if the actual sensed temperature (T) is between 35° C. and 31° C. or equal to 31° C., the fan operates at a speed equal to 90% of the full speed. Moreover, the heat dissipating unit achieves low operating intensity (S×70%) within the low temperature range (31° C.>T≧27° C.). In other words, if the actual sensed temperature (T) is between 31° C. and 27° C. or equal to 27° C., the fan operates at a speed equal to 70% of the full speed. Additionally, the heat dissipating unit achieves the lowest operating intensity (S×60%) within the lowest temperature range (27° C.>T). In other words, if the actual sensed temperature (T) is lower than 27° C., the fan operates at a speed equal to 60% of the full speed. That is, the hardware device of the computer system can actuate the heat dissipating unit thereof to generate different heat dissipating efficiencies within different temperature ranges to perform heat dissipation. The values described above and shown in FIG. 3 only serve as an embodiment, and can be modified depending on the user's requirement in practice.

Figure 4:
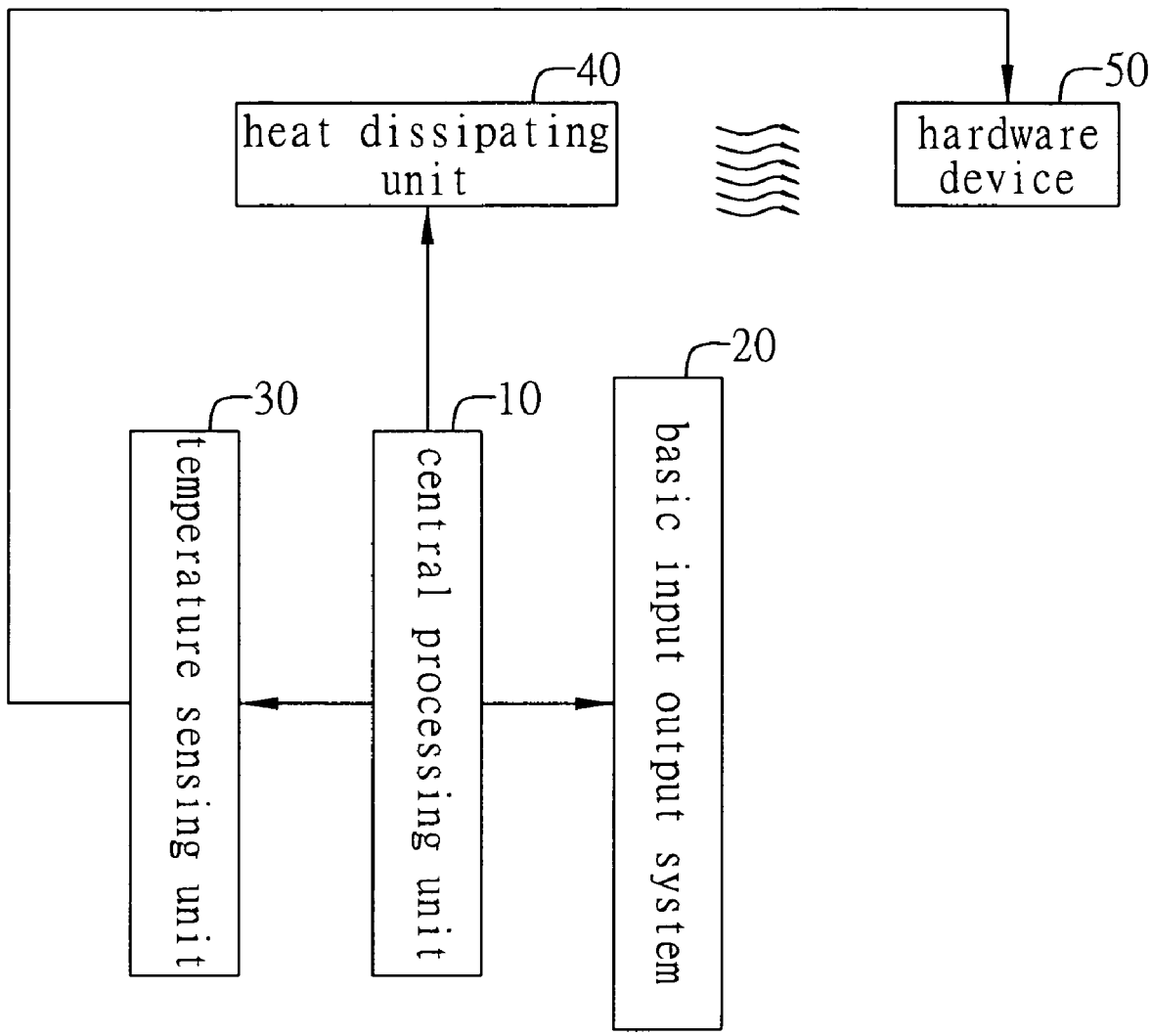
FIG. 4 is a block diagram showing basic architecture in the use of the heat dissipating method according to the present invention.

Moreover, referring to FIG. 4 showing basic architecture in the use of the heat dissipating method according to the present invention, a periodic signal is regularly outputted to a basic input output system 20 and a temperature sensing unit 30 respectively by a timing signaling mechanism of a central processing unit 10 (such as the foregoing south bridge chipset and SIO chipset) of a computer system, and a control signal is outputted according to a temperature sensed by the temperature sensing unit 30 and a dissipating temperature operating mode set in the basic input output system 20 so as to perform a heat dissipation process on a hardware device 50 by a heat dissipating unit 40. The detailed embodiments and steps thereof are foregoing described and thus not to be further repeated.

According to the foregoing description and drawings, the technical features and embodiments of the present invention can be clearly understood. The heat dissipating method in the present invention allows the timing signaling mechanism to regularly transmit a signal to the basic input output system so as to control the operating intensity of the heat dissipating units. Therefore, hardware monitoring can be achieved without requiring additional software or hardware, and heat dissipating and operation efficiencies of the hardware devices of the computer system can be improved.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A heat dissipating method applicable to a computer system having a timing signaling mechanism, so as to allow the timing signaling mechanism to cooperate with a basic input output system (BIOS) of the computer system to actuate a heat dissipating unit for reducing a temperature of each of hardware devices of the computer system according to the temperature of each of the hardware devices and improve heat dissipating and operation efficiencies of the computer system, the heat dissipating method comprising the steps of:
    (1) providing the computer system with a temperature sensing unit for sensing the temperature of each of the hardware devices;
    (2) performing a process of setting a dissipating temperature operating mode in the basic input output system, wherein the dissipating temperature operating mode represents different heat dissipating efficiencies generated by the heat dissipating units of the hardware devices within different temperature ranges; and
    (3) regularly transmitting a periodic signal to the basic input output system via the timing signaling mechanism of the computer system; and
    (4) regularly sensing the temperature of each of the hardware devices via the temperature sensing unit, obtaining a pulse width modulation (PWM) control interval value range corresponding to the sensed temperature and an actual PWM control value of the heat dissipating unit, and determining whether the actual PWM control value is within the PWM control interval value range corresponding to the sensed temperature; if yes, repeating step (3); if no, modifying the actual PWM control value according to the dissipating temperature operating mode of the basic input output system, so as to allow the heat dissipating unit of each of the hardware devices to perform a heat dissipation process by the actual PWM control value according to the temperature sensed by the temperature sensing unit and the dissipating temperature operating mode set in the basic input output system, wherein the heat dissipation process allows the heat dissipating units of the hardware devices of the computer system to achieve specific operating intensity within a specific temperature range.

2. The heat dissipating method of claim 1, wherein the process of setting the dissipating temperature operating mode is performed by the basic input output system.

3. The heat dissipating method of claim 1, wherein the process of setting the dissipating temperature operating mode is performed in a power-on self test (POST) phase of the computer system.

4. The heat dissipating method of claim 1, wherein content of the dissipating temperature operating mode is established by a user.

5. The heat dissipating method of claim 1, wherein the dissipating temperature operating mode is stored in a storage unit of the computer system.

6. The heat dissipating method of claim 5, wherein the storage unit is selected from the group consisting of flash read-only memory (ROM), programmable ROM, erasable programmable ROM and electrically erasable programmable ROM.

7. The heat dissipating method of claim 1, wherein the timing signaling mechanism of the computer system, after entering an operating system (OS) phase, regularly transmits the periodic signal to the basic input output system.

8. The heat dissipating method of claim 7, wherein the periodic signal is a system management interrupt signal.

9. The heat dissipating method of claim 1, wherein the temperature sensing unit, after entering an operating system (OS) phase of the computer system, regularly senses the temperature of each of the hardware devices.

10. The heat dissipating method of claim 9, wherein the temperature sensing unit, after entering the operating system (OS) phase of the computer system, regularly senses the temperature of each of the hardware device according to a periodic signal.

11. The heat dissipating method of claim 10, wherein the periodic signal is outputted by the timing signaling mechanism.

12. The heat dissipating method of claim 11, wherein the periodic signal is a system management interrupt signal.

13. The heat dissipating method of claim 1, wherein the timing signaling mechanism is provided in a chipset.

14. The heat dissipating method of claim 13, wherein the chipset is a south bridge chipset.

15. The heat dissipating method of claim 1, wherein the heat dissipating unit is a fan.

16. The heat dissipating method of claim 1, wherein the actual PWM control value is outputted by a pulse width modulation controller provided in a chipset.

17. The heat dissipating method of claim 16, wherein the chipset is a super input/output chipset.

18. The heat dissipating method of claim 1, wherein the hardware device is selected from the group consisting of a central processing unit, hard disk, memory, CD/DVD-ROM drive, floppy disk drive, power supplier and casing.

19. The heat dissipating method of claim 1, wherein the heat dissipation process allows the heat dissipating unit to achieve highest operating intensity within a highest temperature range, achieve moderate operating intensity within a moderate temperature range, achieve low operating intensity within a low temperature range, and achieve lowest operating intensity within a lowest temperature range.

* * * * *